United States Patent [19]

Marez et al.

[11] 4,315,304
[45] Feb. 9, 1982

[54] STARTING CIRCUIT FOR A HIGH FREQUENCY MAGNETIC AMPLIFIER POWER SUPPLY

[75] Inventors: Alejandro Marez; Jon J. Spÿkerman, both of Fort Worth, Tex.

[73] Assignee: Kyber Engineering, Inc., Fort Worth, Tex.

[21] Appl. No.: 91,791

[22] Filed: Nov. 6, 1979

Related U.S. Application Data

[62] Division of Ser. No. 864,771, Dec. 27, 1977, abandoned.

[51] Int. Cl.³ .............................................. H02P 1/02
[52] U.S. Cl. .................................... 363/49; 340/662; 361/91; 363/56
[58] Field of Search ............ 331/113 A, 114; 363/49; 323/901

[56] References Cited

U.S. PATENT DOCUMENTS

| | | | |
|---|---|---|---|
| 2,922,958 | 1/1960 | Dean | 331/113 A |
| 3,085,211 | 4/1963 | Jensen et al. | 331/113 A |
| 3,444,481 | 5/1969 | Fisher | 363/49 X |
| 3,704,430 | 11/1972 | Westerman | 331/113 A |
| 4,047,089 | 9/1977 | Suzuki et al. | 363/49 |

FOREIGN PATENT DOCUMENTS

1800188  2/1970  Fed. Rep. of Germany ........ 363/49

*Primary Examiner*—A. D. Pellinen
*Attorney, Agent, or Firm*—Richards, Harris & Medlock

[57] ABSTRACT

A regulated power supply includes a starting circuit that initiates oscillating inverter circuit that generates a high frequency square wave signal that drives a saturable reactor which pulse-width modulates the square wave as a function of a control current through a control winding on the saturable reactor. A protective circuit is provided to sense an output overvoltage condition and inactivate the power supply by terminating the oscillation of the inverter and simultaneously resetting the starting circuit.

5 Claims, 3 Drawing Figures

STARTING CIRCUIT FOR A HIGH FREQUENCY MAGNETIC AMPLIFIER POWER SUPPLY

CROSS REFERENCE TO RELATED APPLICATIONS

This is a division of application Ser. No. 864,771, filed Dec. 27, 1977, abandoned Apr. 8, 1980.

BACKGROUND OF THE INVENTION

The present invention relates to electrical power supplies and more particularly to a saturable reactor power transformation and regulation system.

Power supplies for electronic devices are divided into generally two types. In one type of conventional linear power supply, the input alternating current is transformed to the appropriate voltage, rectified, and filtered by an assortment of capacitors and inductors. A linear regulator is then provided in the output circuit to maintain a constant output voltage. Although this design is widely used, it requires the use of heavy transformers and capacitors and has a relatively low power transform efficiency.

In a second type of conventional power supply, the incoming alternating power signal is rectified and filtered and supplied to an inverter circuit. The inverter switches the filtered signal on and off at a high rate to generate a high frequency square wave. An output transformer then converts the square wave to the desired voltage level and the resulting signal is passed through a rectifying network and filters to produce a DC output. The output of the power supply is regulated by varying the pulse width of the signal generated by the inverter. Although this design uses lighter components and has a relatively high transform efficiency, it produces substantial noise in the output. This level of noise is often unacceptable in the operation of computers and other transistor switching circuits.

In accordance with the present invention, there is provided a power supply which is not only lightweight and efficient but also generates a low noise output with a closely regulated voltage level.

SUMMARY OF THE INVENTION

A DC power supply in accordance with the present invention utilizes a high frequency saturable reactor wherein parallel stacks of ferrite toroids are separated by a nonmagnetic plate. A control winding passes through the centers of both stacks and a pair of gate windings are connected in series, with each winding passing through the center of one stack. The saturable reactor is driven by an oscillating inverter which is initiated by a starting circuit. Upon activation of the power supply, a transistor is forward biased to turn on a first of a pair of oscillating transistors. A capacitor is charged by the oscillator output to reverse bias the transistor after oscillation is begun.

The power supply has an overvoltage protection circuit wherein a zener diode detects an overvoltage condition and activates a silicon controlled rectifier to ground the secondary winding of a transformer in the inverter and terminates oscillation of the inverter and simultaneously resets the starting circuit.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
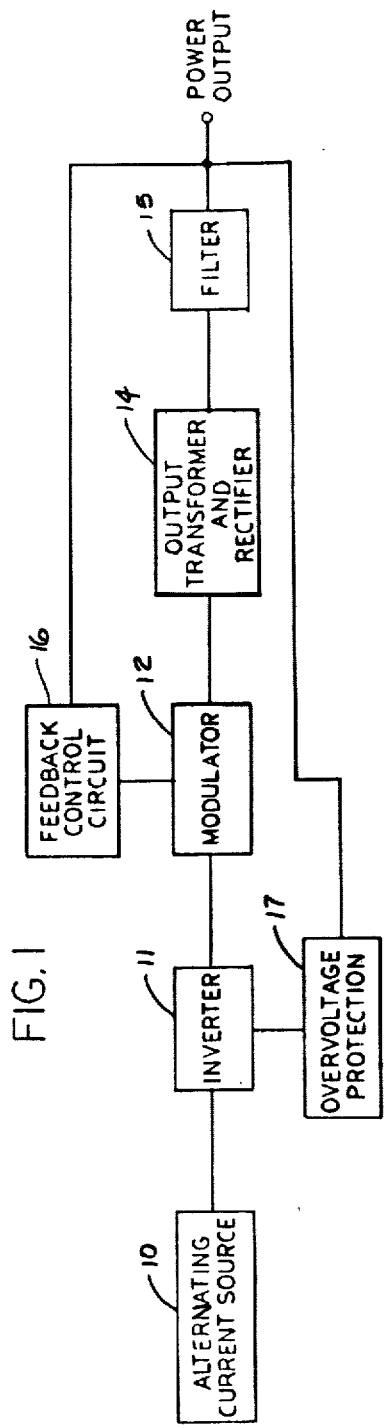
FIG. 1 is a block diagram of a power supply in accordance with the present invention.

FIG. 1 illustrates a power supply in accordance with the present invention. A conventional alternating current source 10 provides power to an inverter 11 which generates a higher frequency square wave output signal. This output signal is provided to the control winding of a modulator 12 which regulates the power level of a voltage applied to an output transformer and rectifier 14 by pulse-width modulating the square wave signal input to the modulator. The output transformer 14 is selected to provide the desired output voltage of the power supply through a filter 15. A constant output voltage level is maintained by a feedback control circuit 16 that generates a control current to the modulator 12. The amplitude of the control current is proportional to the power transferred from the inverter 11 to the output transformer 14 which in turn determines the voltage provided at the output of the filter 15. The output voltage is also monitored by an over-voltage protection circuit 17 that generates a signal to disable the inverter 11 when the output voltage exceeds a predetermined level. Thus, there is provided a power supply which provides a regulated output, compensates for source and load power variation, and protects the load from application of an excessive voltage.

Figure 2A:
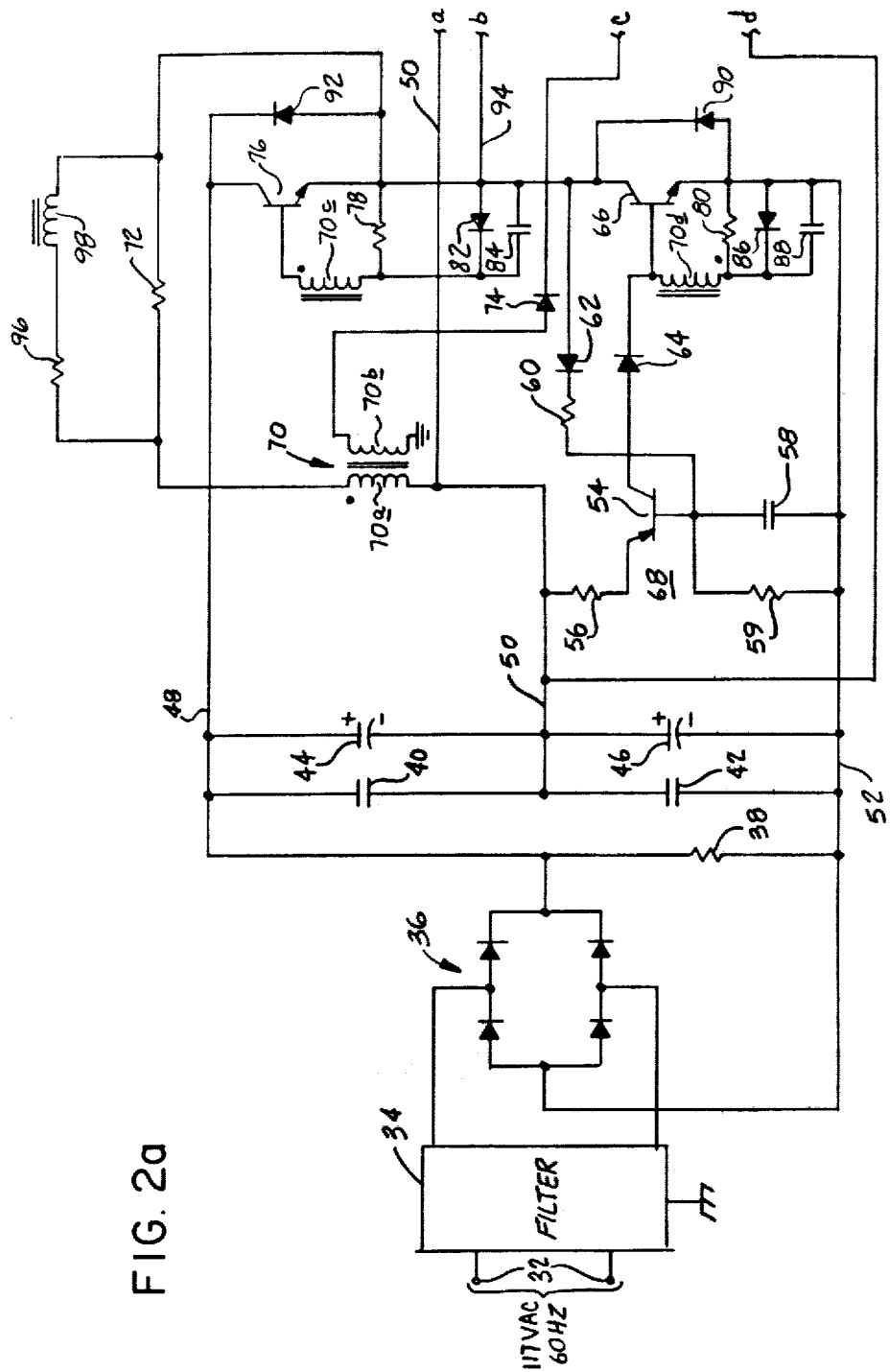
FIGS. 2a and 2b are a schematic diagram of a power supply in accordance with the present invention.
Figure 2B:
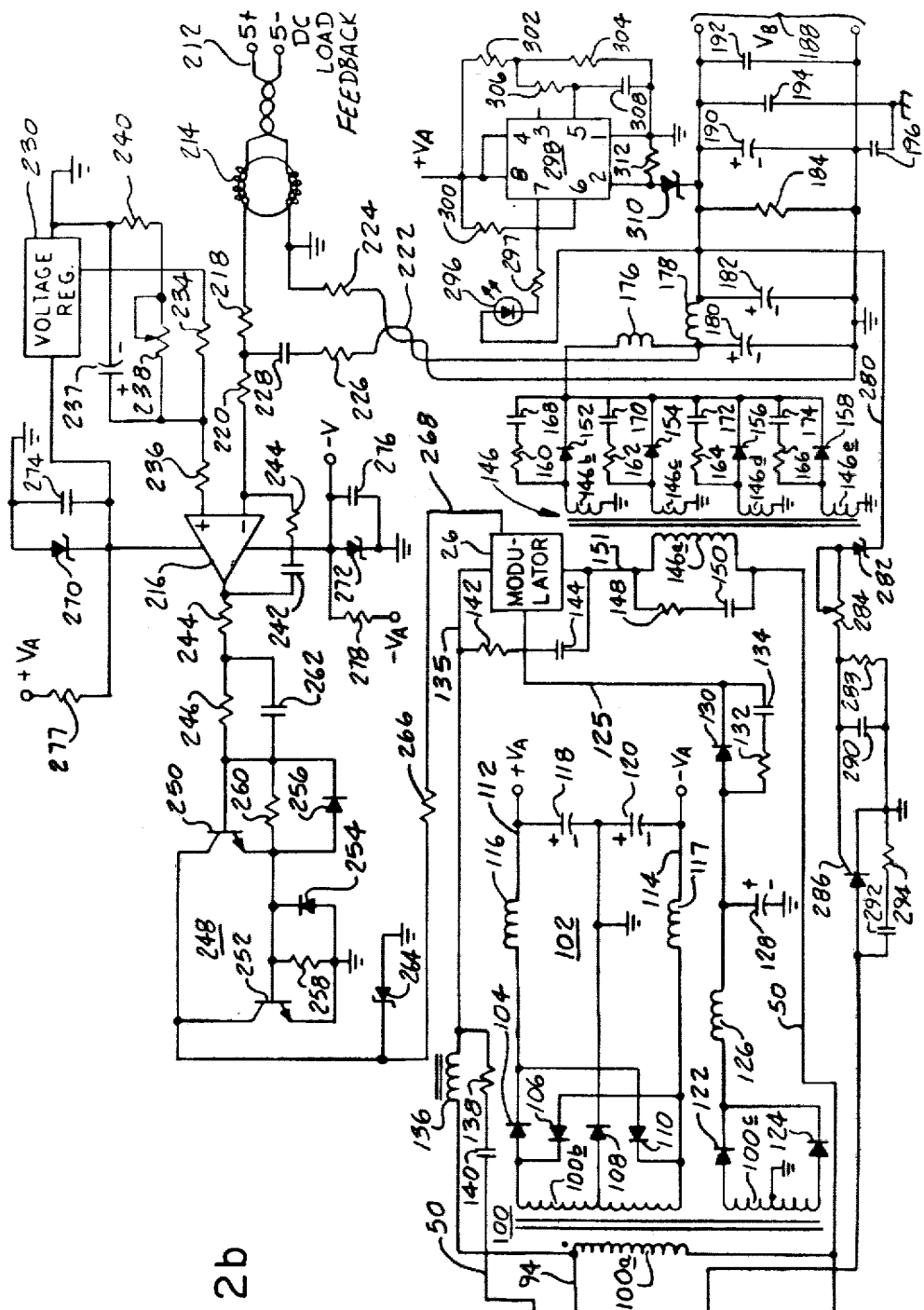

Referring to FIGS. 2a and 2b, there is shown a schematic of the power supply of FIG. 1. An alternating current power source is connected to the input lines 32 through a radio frequency interference (RFI) filter 34 to a full-wave rectifier 36. A resistor 38 is disposed across the output lines of the full wave rectifier 36 and is in parallel with a series combination of filter capacitors 40 and 42. Energy storage capacitors 44 and 46 are disposed in parallel with capacitors 40 and 42 respectively. With a 117 volt alternating current 60 hertz power source, there is produced on line 48 a positive 85 volt DC signal with respect to line 50 and a minus 85 volt DC signal on line 52 also with respect to line 50.

The emitter of a transistor 54 is connected to line 50 through a load resistor 56, and the base of transistor 54 is connected by a capacitor 58 to line 52. Resistor 59 is in parallel with capacitor 58. A resistor 60 is connected between the base of transistor 54 and the cathode of a diode 62. The collector of transistor 54 is connected through a diode 64 to the base of a transistor 66. The transistor 54 and its adjacent circuit element comprise a starting circuit 68.

A transformer 70 has a primary winding 70a which is connected between line 50 and a resistor 72. A secondary winding 70b of transformer 70 is connected between ground and a diode 74. Secondary 70c of transformer 70 is connected between the base of a transistor 76 and a resistor 78 and a secondary winding 70d is joined between the base of the transistor 66 and a resistor 80.

A blocking diode 82 and a capacitor 84 are connected in parallel with the resistor 78. Another blocking diode 86 and a capacitor 88 are connected in parallel with the resistor 80. Protection diodes 90 and 92 are connected between the collectors and emitters of transistors 66 and 76 respectively.

Transistors 66 and 76 together with the associated circuitry function as an inverter to produce a high frequency square wave signal on line 94, which joins the emitter of transistor 76 to the collector of transistor 66. The output signal on line 94 is produced by the transistors 66 and 76 being alternately turned on and off. Oscillation of the inverter circuitry is initiated by the starting circuit 68.

When power is initially applied to terminals 32 the transistors 54, 66, and 76 will be off. Since the capacitor 58 is initially discharged, the base of transistor 54 will be at a minus 85 volt potential and the emitter will be at a higher potential due to the resistor 56. Since the emitter is at a higher potential than the base, transistor 54 will be forward biased therefore also forward biasing diode 64. A voltage at the cathode of the diode 64 is then applied as a potential to the base of transistor 66, and this voltage is higher than the potential at the emitter. This higher potential applied to the base of transistor 66 relative to the emitter, which is connected to line 52, forward biases transistor 66. Capacitor 58 now rapidly charges through diode 62 and resistor 60 after the power is applied and transistors 66 and 76 start to oscillate. As it charges, capacitor 58 reverse biases transistor 54 thereby turning it off and opening the connection between line 50 and the base of transistor 66.

When transistor 66 is forward biased its collector electrode is effectively connected to line 52 thereby applying a minus 85 volt potential to the primary 70a of the transformer 70. The resulting current flow through this primary winding induces voltages in secondary windings 70c and 70d which tend to enhance the forward bias on transistor 66 and apply a reverse bias to transistor 76 thereby holding it in an off state. When transformer 70 has saturated, the induced voltages in the secondary windings 70c and 70d drop to zero thereby causing transistor 66 to be switched off. This opens the circuit passing from line 50 through primary 70a to line 52. Opening this circuit causes the field in transformer 70 to collapse which in turn produces reverse voltages in secondary windings 70c and 70d. The voltage now induced in secondary winding 70c will forward bias transistor 76 thereby turning it on while the voltage induced in secondary winding 70d will tend to hold transistor 66 turned off by means of reverse bias voltage.

With transistor 76 forward biased, line 48 is connected to the primary winding 70a of the transformer 70. The current flow through the primary winding 70a induces a voltage in secondary winding 70c to further forward bias this transistor and hold it on. A voltage is also induced in the secondary winding 70d to reverse bias transistor 66 and turn it off. When transformer 70 has saturated, the biasing voltage on transistor 76 will be removed and transistor 76 will open. This opens the circuit of the primary winding 70a and causes the field to collapse thereby inducing opposite polarity voltages in secondary windings 70c and 70d. These induced voltages will cause transistor 66 to be biased on and transistor 76 to be biased off. This process is repeated as long as power is supplied thereby generating a square wave signal on line 94. In one embodiment of the invention the square wave signal has a frequency of 30 kilohertz.

Blocking diodes 82 and 86 are provided to prevent improper biasing of transistors 76 and 66 respectively. Capacitors 84 and 88 provide a means for suppressing the transient voltages created when the fields in the secondary windings 70c and 70d collapse.

The series combination of resistor 96 and inductor 98 are in parallel with the resistor 72. Resistor 96 is selected to be of a value smaller than resistor 72. For any voltage transistions on line 94 the inductor 98 initially presents a very high impedance thereby making the effective impedance in the line 94 that of resistor 72. However, as soom as inductor 98 saturates, it in effect becomes a short circuit and the impedance in the line 94 becomes the parallel combination of resistors 96 and 72, a smaller value than that of resistor 72 alone. Inductor 98 is selected to be of an inductance that will cause saturation prior to the saturation of primary winding 70a of transformer 70. The function of inductor 98 and resistor 96 is to produce a sharp transition from the positive and negative extremes of the square wave on line 94. The low impedance at the end of the cycle increases the current flow so as to maintain the peak voltage until the transition occurs. This prevents the trailing transition from becoming rounded, thereby reducing the power transferred from the inverter.

Referring to FIG. 2b, the square wave signal on line 94 is supplied to a transformer 100 having a primary winding 100a and secondary windings 100b and 100c. Transformer 100 drives an auxillary power supply circuit 102 which produces supply voltages for driving other circuits within the power supply. Secondary winding 100b drives bridge rectifiers 104, 106, 108, and 110 to produce a positive voltage ($+V_A$) on line 112 and a negative voltage ($-V_A$) on line 114. Inductors 116 and 117 and capacitors 118 and 120 are provided to filter the supply voltages. In one embodiment of the invention the $V_A$ voltages are plus and minus 25 volts respectively.

Also included in the auxiliary power supply 102 is the center tap secondary 100c which drives diodes 122 and 124 to produce a DC voltage to a first control terminal, on line 125, of a modulator 26. Inductor 126 and capacitor 128 provide filtering for the signal thus produced. Diode 130 is disposed in series between the inductor 126 and the first control terminal of modulator 26. A series combination of a resistor 132 and a capacitor 134 are in parallel with the diode 130 and provide a means for suppressing diode damaging voltage transients.

Line 94 is also connected to the first gate terminal of modulator 26 through an inductor 136 in a line 135. Also connected to the line 135 is a series combination of a resistor 138 and a capacitor 140, the later tied to the line 50.

A resistor 142 and a capacitor 144 are in a series combination between the first and second gate terminals of modulator 26. Also connected to the second terminal of the modulator 26 is a transformer 146 having a primary winding 146a connected in parallel with a series combination of a resistor 148 and a capacitor 150. Joined to the second terminal of the primary winding 146a is the second terminal of primary winding 100a of transformer 100.

Transformer 146 has secondary windings 146b, 146c, 146d, and 146e having respectively disposed in series therewith diodes 152, 154, 156, and 158. To suppress voltage spikes the diodes 152, 154, 156, and 158 are connected in parallel with resistors 160, 162, 164, and 166 together with capacitors 168, 170, 172, and 174 respectively. A filter inductor 176 is tied to a common interconnection of the diodes 152, 154, 156 and 158. An additional filter inductor 178 is in series with the filter inductor 176 and forms a T-filter network with capacitors 180 and 182. As a part of an output circuit, a load resistor 184 is connected in parallel with energy storage capacitors 190 and 192. Also forming a part of the output circuit are capacitors 194 and 196 interconnected between the positive terminal of output terminals 188 and ground.

In operation, the square wave signal on line 94 is applied to the first gate terminal, line 135, of modulator 26 which has the second gate terminal, line 151, connected through the primary winding of transformer 146 to line 52. Modulator 26 functions to pulse-width modulate the square wave signal on line 135. The output of the modulator on line 151 is supplied to the primary winding of transformer 146. Control signals applied to the modulator 26 provide the pulse-width modulation.

The output of the modulator 26 on line 151 is coupled to the primary winding 146a of the transformer 146. Positive-going current pulses on line 151 induce pulse voltages in secondary windings 146b and 146c which are passed through diodes 152 and 154 to the immediately following filter and storage elements. Negative-going pulses are transferred to secondary windings 146d and 146e and passed through diodes 156 and 158. Filter elements 176, 178, 180, 182, 190, 192, 194, and 196 are provided to suppress voltage transients and to smooth the output voltage.

The output of the power supply, $V_B$, at the output terminals 188, can be used to power a device at a remote location. Conventional loads, which are powered in this manner, include computers and other types of transistor switching devices together with their peripheral equipment. In order to maintain a constant voltage level at the user device, the present invention provides a feedback regulation network. A DC load feedback cable 212 is provided to feed back the voltage supplied to the user device located remote from the power supply. Cable 212 is connected through an RFI filter 214 to remove any transient voltages generated by either the user device or induced into the load feedback cable 212 by other local electrical equipment. The feedback output voltage is provided to the inverting input of an operational amplifier 216 through a series combination of mixing resistors 218 and 220.

Ripple voltages generated by the power supply are monitored over a cable 222. These ripple voltages are mixed with the feedback load voltage at the junction of the mixing resistors 218 and 220. The grounded lead of the cable 222 is connected through a resistor 224 to the ground terminal of the cable 212. The second lead of cable 222 is connected through the series combination of a resistor 226 and a capacitor 228 to the interconnection of resistors 218 and 220 to eliminate DC voltages.

A reference input is applied to the noninverting input of the operational amplifier 216. This reference voltage is supplied by a voltage regulator 230 which is powered by the positive voltage, $+V_A$, that is generated by the auxiliary power supply 102, previously described. The output of the voltage regulator 230 is passed through the series combination of voltage divider resistors 234 and 236. A capacitor 237 is connected between the junction of resistors 234 and 236 and circuit ground. A potentiometer 238 is disposed between the junction of the resistors 234 and 236 and in series with a resistor 240 which is connected to ground. The potentiometer 238 is adjusted to set the output voltage, $V_B$, generated by the power supply at the output terminals 188. This potentiometer sets the reference voltage which is supplied to the noninverting input of the operational amplifier 216. Negative feedback is provided to the operational amplifier 216 by the series combination of a capacitor 242 and a resistor 244.

A control signal is generated by the operational amplifier 216 and is passed through a series combination of resistors 244 and 246 to a Darlington amplifier 248. The Darlington amplifier includes transistors 250 and 252 together with diodes 254 and 256, resistors 258 and 260 and a capacitor 262. A zener diode 264 is connected between the collector of transistor 252 and ground to attenuate voltage transients. The collector of transistor 252 is connected through a current limiting resistor 266 to a control terminal, line 268, of the modulator 26. The Darlington circuit 248 acts as a current sink for the control winding 22 of the modulator 26 and is driven by the control signal output of the operational amplifier 216. The second terminal of the control winding 22 is provided with a constant voltage by the auxiliary power supply 102 on the line 125. This voltage is passed through the control winding of the modulator 26 to the line 268 through the current limiting resistor 266 and to the collector of transistor 252. Thus, the drive voltage applied to the Darlington amplifier 248 determines the amplitude of the current which is passed through the control winding 22 of the modulator 26.

Operational amplifier 216 is powered by the auxiliary power supply 102 which supplies positive voltage $(+V_A)$ and negative voltage $(-V_A)$ to voltage control circuits including zener diodes 270 and 272. Zener diodes 270 and 272 together with the respective filter capacitors 274 and 276 provide the desired plus and minus 15 volt drive for the operational amplifier 216. The resistors 277 and 278 act as a voltage dividers between the $V_A$ voltages and the voltage drives to the operational amplifier 216.

In operation, the feedback circuit monitors both the DC voltage level at the user load and the AC ripple on the output voltage of the power supply. Variations in these levels away from the desired reference cause a control signal to be generated by the operational amplifier 216. This control signal drives the Darlington amplifier 248 which increases or decreases the current passing through the control winding 22 of the modulator 26. As the control current varies, the pulse width modulation of the power signal is proportionately varied which in turn controls the current that is transferred from the gate windings 23 and 24 of the modulator 26 to the primary winding of the transformer 146. An increase in current to the transformer from the modulator increases the power supply output voltage while a decrease reduces the output voltage. Thus, a closed loop feedback system is provided wherein the output voltage is maintained at a constant level by regulating the current through the control winding of the modulator 26.

A further feature of the present invention is an overvoltage protection circuit which deactivates the power supply when the output voltage exceeds a predetermined threshold. This feature is provided to prevent damaging the load connected to the power supply. The output voltage is monitored on line 280 which is connected through a zener diode 282 to a potentiometer 284. The potentiometer 284 is connected in series with the gate terminal of a silicon controlled rectifier (SCR) 286. Disposed in parallel between the gate terminal of SCR 286 and ground are a resistor 288 and a capacitor 290. Between the anode of SCR 286 and ground there is connected in series a capacitor 292 and a resistor 294.

The level at which the overvoltage circuit is activated is determined by the potentiometer 284 which acts as a voltage divider in series with the resistor 288. The zener diode 282 provides a stable reference for setting the overvoltage limit.

The anode of SCR 286 is connected to secondary winding 70b of transformer 70 such that when the SCR is conducting, the secondary winding 70b is grounded thereby short circuiting the primary winding 70a and disabling the transformer 70. Since the transformer 70 drives the transistors 66 and 76 that generate the high frequency square wave provided to the modulator 26, the grounding of the secondary winding 70b terminates the oscillations and removes the power which is applied to the modulator. Activation of the SCR 286 occurs when the output voltage $V_B$ exceeds the predetermined threshold set by the potentiometer 284 and triggers the SCR through its gate terminal. After the SCR 286 has been triggered it remains conducting only for the short period that is required to discharge the field in the transformer 70. When the field in the transformer is discharged, the SCR is turned off and the excessive output voltage is no longer present. Capacitor 290 is provided to bypass overvoltage transients which would unnecessarily deactivate the power supply.

After SCR 286 has turned off transistors 66 and 76, capacitor 58, which was charged to a positive 85 volts relative to line 50, is discharged through resistor 59. When the voltage on the base of transistor 54 drops below that of line 50, the transistor 54 is forward biased and restarts the oscillations in transistors 66 and 76 as previously described.

An overvoltage indicator is also provided in the present invention. This indicator is activated to show that the output voltage is in excess of that which is desired but is still less than the threshold required to trip the overvoltage protection circuit. Such operation provides an early warning of a possible failure and indicates a marginal operating condition. An overvoltage indicator light emitting diode 296 is driven by an integrated circuit 298. In one embodiment the integrated circuit 298 is a model NE555 manufactured by National Semiconductor. The indicator 296 is connected between the positive terminal of the output voltage $V_B$ and a sink terminal, pin 7, of the integrated circuit. The power to the integrated circuit is provided by the auxiliary power supply 102 which generates positive voltage $(+V_A)$ to the input on terminals 4 and 8 of the integrated circuit. An external resistor 300 is connected between the voltage supply and terminal 6 of the integrated circuit. Further voltage divider resistors 302, 304, and 306 are connected between the voltage source and terminals 5 and 1. An external capacitor 308 is connected between terminals 5 and 1 of the integrated circuit 298.

The integrated circuit is triggered through terminal 2 which senses the voltage generated at the output terminals 188. A zener diode is connected between terminal 2 and the positive terminal of the output 188. A resistor 312 is connected between terminal 2 and ground. Selection of the level at which the indicator is activated is determined by the zener diode 310. When an excessive voltage is generated which reverse biases zener diode 310, a current sink is applied to terminal 7 which activates light emitting diode 296 through the resistor 297.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

What is claimed is:

1. A starting circuit for generating an output pulse to initiate an oscillator circuit, the oscillator circuit including first and second transistors, having a common connection as an output terminal, comprising in combination:

a transistor having one electrode connected to the base electrode of one transistor of the oscillator circuit and a second electrode as an input terminal,
   voltage supply means for generating a voltage at a first terminal to the input terminal of said transistor,
   a capacitor connected to a third electrode of said transistor and to a second terminal of said voltage supply means, and
   a resistor connected between the interconnection of the first and second transistors of the oscillator circuit and the interconnection of the third electrode of said transistor with said capacitor to charge said capacitor to reverse bias said transistor.

2. A starting circuit as recited in claim 1 further including a resistor in parallel with said capacitor.

3. A starting circuit as recited in claim 1 includes a first diode in series with said resistor connected to the third electrode of said transistor.

4. A starting circuit as recited in claim 1 further including a third resistor disposed between the second electrode of said transistor and input terminal.

5. A starting circuit as recited in claim 1 further including a second diode connected between the first electrode of said transistor and the base electrode of the transistor of the oscillator circuit.

* * * * *